(12) United States Patent
Ouedraogo et al.

(10) Patent No.: US 9,674,228 B2
(45) Date of Patent: Jun. 6, 2017

(54) METHOD OF PROCESSING DISORDERED FRAME PORTION DATA UNITS

(71) Applicant: CANON KABUSHIKI KAISHA, Tokyo (JP)

(72) Inventors: Naël Ouedraogo, Maure de Bretagne (FR); Franck Denoual, Saint Domineuc (FR); Frédéric Maze, Langan (FR); Cyril Concolato, Combs la Ville (FR); Jean Le Feuvre, Cachan (FR)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 14/518,968

(22) Filed: Oct. 20, 2014

(65) Prior Publication Data

US 2015/0110118 A1    Apr. 23, 2015

(30) Foreign Application Priority Data

Oct. 22, 2013  (GB) .................................. 1318684.6

(51) Int. Cl.
*H04L 29/08* (2006.01)
*H04N 19/85* (2014.01)
*H04N 19/436* (2014.01)
*H04L 29/06* (2006.01)
*H04N 19/61* (2014.01)

(52) U.S. Cl.
CPC .......... *H04L 65/00* (2013.01); *H04N 19/436* (2014.11); *H04N 19/61* (2014.11); *H04N 19/85* (2014.11)

(58) Field of Classification Search
CPC ......... H04L 47/10; H04L 47/34; H04L 29/06; H04L 49/90; H04Q 11/0478
See application file for complete search history.

(56) References Cited

U.S. PATENT DOCUMENTS

| 5,648,970 | A  | * | 7/1997  | Kapoor | H04L 47/10 370/394 |
| 6,389,016 | B1 | * | 5/2002  | Sabaa  | H04L 1/1635 370/231 |
| 6,775,279 | B2 | * | 8/2004  | Murai  | H04L 12/18 370/260 |
| 7,684,344 | B2 | * | 3/2010  | Aloni  | G06F 13/128 370/252 |
| 8,897,361 | B2 | * | 11/2014 | Tanaka | H04N 19/44 375/240.01 |

(Continued)

FOREIGN PATENT DOCUMENTS

| WO | 2013/048311 A1 | 4/2013 |
| WO | 2014/011567 A1 | 1/2014 |

OTHER PUBLICATIONS

RTP payload format for scalable video coding, IETF, May 2011 [Accessed Apr. 3, 2014] Available at http://tools.ietf.org/html/rfc6190 See pp. 73-78 in particular.

*Primary Examiner* — Maharishi Khirodhar
*Assistant Examiner* — Sanjay K Dewan
(74) *Attorney, Agent, or Firm* — Canon USA, Inc. I.P. Division

(57) ABSTRACT

A method of encapsulating data units of at least one encoded video frame into a data stream, said data units representing frame portions of the video frame, wherein said data stream is associated with an ordering information indicating the compliance of the order of the data units with a nominal data unit decoding order. Embodiments of the invention provide flexible transmission with robust and flexible decoders.

29 Claims, 11 Drawing Sheets

(56) References Cited

U.S. PATENT DOCUMENTS

| | | | |
|---|---|---|---|
| 9,036,697 B2* | 5/2015 | Esenlik | H04N 7/26244 348/43 |
| 9,167,248 B2* | 10/2015 | Chen | H04N 19/70 |
| 9,225,978 B2* | 12/2015 | Wang | H04N 19/00 |
| 9,350,781 B2* | 5/2016 | Coban | H04L 65/607 |
| 2007/0183494 A1* | 8/2007 | Hannuksela | H04N 21/234327 375/240.1 |
| 2014/0086333 A1* | 3/2014 | Wang | H04N 19/70 375/240.25 |
| 2016/0015367 A1* | 1/2016 | Schneider | A61B 8/0883 600/437 |
| 2016/0062567 A1* | 3/2016 | Yang | G06F 3/0482 715/716 |

\* cited by examiner

```
aligned(8) class SubSampleInformationBox extends FullBox('subs', version, 0) {
   unsigned int(32) entry_count;
   int i,j;
   for (i=0; i < entry_count; i++) {      // would be sample count in our case
      unsigned int(32) sample_delta;      // differential timestamp of the sample
      unsigned int(16) subsample_count;   // Ex: number of tiles or slices
      if (subsample_count > 0) {
         for (j=0; j < subsample_count; j++) {
            if (version == 1) {
               unsigned int(32) subsample_size;
            } else {
               unsigned int(16) subsample_size;
            }
            unsigned int(8) subsample_priority;
            unsigned int(8) discardable = 1;  // sample can be decoded without this sub-sample
            unsigned int(32) reserved;
         }
      }
   }
}
```
800

```
if (flags == 0) {
   unsigned int(1) SubLayerRefNalUnitFlag
   unsigned int(1) RapNalUnitFlag
   unsigned int(1) VclNalUnitFlag
   unsigned int(29) reserved = 0
} else if (flags == 1) {
   unsigned int(32) reserved = 0
} else if (flags == 2) {        // Tile NALUs
   unsigned int(2) vcl_idc,
   unsigned int(2) reserved = 0,
   unsigned int(4) log2_min_luma_ctb,
   unsigned int(12) ctb_x
   unsigned int(12) ctb_y
} else if (flags == 3 | flags == 4) {
   unsigned int(2) vcl_idc,
   unsigned int(30) reserved = 0
}
```
801

Fig. 8

```
aligned(8) class SubSampleInformationBox extends FullBox('subs', version, 0) {                           ─ 901
    unsigned int(32) entry_count;
    int i,j;
    if (version ==2) {
        unsigned int (1) in_order_flag;    // Extension => flag to indicate if NALUs are in decoding order or not   ─ 902
        unsigned int (2) disorder_level;                                                                            ─ 903
        unsigned int (5) buffering_level;                                                                           ─ 904
    }
    for (i=0; i < entry_count; i++) {
        unsigned int(32) sample_delta;       // would be sample count in our case
                                             // differential timestamp of the sample
        unsigned int(16) subsample_count;    // Ex: number of tiles or slices
        if (subsample_count > 0) {                                                                                  ─ 900
            for (j=0; j < subsample_count; j++) {
                if (version >= 1)  unsigned int(32) subsample_size;
                else               unsigned int(16) subsample_size;
                unsigned int(8) subsample_priority;
                unsigned int(8) discardable = 1;
                unsigned int(32) reserved;

if (flags == 2) {    // The NALUs                                                                   ─ 905
                    unsigned int(2) vcl_idc
                    if (version == 2) {
                        unsigned int (1) reordering_hints
                        unsigned int (29) reserved;
                    } else unsigned int(2) reserved = 0;
                    unsigned int(4) log2_min_luma_ctb
                    unsigned int(2) ctb_x  // tile right position
                    unsigned int(2) ctb_y  // tile bottom position
                    if (version == 2 && reordering_hints == 1) {                                                    ─ 907
                        unsigned int (32) decoding_order_number
                    }
                }
                if (flags == 3 || flags == 4) {                                                                     ─ 906
                    unsigned int(2) vcl_idc
                    if (version == 2) {
                        unsigned int (1) reordering_hints
                        unsigned int (29) reserved;
                    } else unsigned int(30) reserved = 0;
                    if (version == 2 && reordering_hints == 1) {                                                    ─ 908
                        unsigned int(32) decoding_order_number
                    }
```

Fig. 9

METHOD OF PROCESSING DISORDERED FRAME PORTION DATA UNITS

This application claims the benefit under 35 U.S.C. §119 (a)-(d) of United Kingdom Patent Application No. 1318684.6, filed on Oct. 22, 2013 and entitled "Method of processing disordered frame portion data units." The above cited patent application is incorporated herein by reference in its entirety.

FIELD OF THE INVENTION

The present invention relates to video applications and is particularly adapted for video data streaming between a server and a client. The invention has applications in the streaming of video data encoded with the ITU-T/MPEG video standard, HEVC (or H.265) or one of its extensions such as Scalable HEVC.

BACKGROUND OF THE INVENTION

The HEVC standard specification defines a set of coding tools that aims at obtaining a high coding efficiency, i.e., the best compromise between quality and size of the encoded video sequence. Frames of a video are generally segmented in several spatial portions and then embedded in network transport containers called NAL (Network Abstraction Layer). One advantage of the segmentation is to favour parallel processing of partitioned data. Several methods can be used for segmenting frames, for embedding encoded partitioned data into separate NAL units and for performing parallel processing. One effect of the parallel processing is that encoded NAL units corresponding to one frame may be generated in a particular order different than the normative order imposed by HEVC specification.

Classically, it is up to the device embedding the encoder to rearrange the encoded NAL units of the bitstream into the normative order. Nevertheless, this rearranging stage is useless if the decoder supports the decoding of NAL units that are not received according to the normative order ("out of order NAL units"), in particular for parallel decoding of the frame (NAL unit orders may be less constrained). Since the arranging stage of the NAL units introduces an additional latency, it is worth considering out of order bitstream to minimize the encoding (and also decoding) latency.

FIG. 1 shows the image coding structure used according to HEVC. The original video sequence is a succession of digital images represented by one or more matrices, the coefficients of which represent pixels.

Image 201 is divided into non-overlapping Coding Tree Units (CTUs) 202, generally blocks of size 64 pixels×64 pixels. Each CTU may in its turn be iteratively divided into smaller variable size Coding Units (CUs) 203 using a quadtree decomposition. Coding units are the elementary coding elements and comprise two sub units called "Prediction Unit" (PU) and "Transform Units" (TU) of maximum size equal to the CU's size. A Prediction Unit corresponds to the partition of the CU for prediction of pixel values. Each CU can be further partitioned into a maximum of 2 symmetric rectangular Partition Units or in asymmetric partitions. Transform units are used to represent the elementary units that are spatially transformed with DCT. A CU can be partitioned in TU based on a quadtree representation.

HEVC standard provides different types of image segmentation mechanisms: slice segments and tiles.

The image 201 is divided into slice segments 208. A slice segment is a part of the image or the entire image. Each slice segment contains an integer number of Coding Tree Units (CTUs).

According to HEVC, the slice segments (208) can be an independent or a dependent slice segment. Each slice segment is embedded into one NAL unit. The value of one flag specified in the slice segment header determines whether the slice segment is independent or dependent. The difference between the two types of slice segments lies within the fact that data in the independent slice segment header defines all parameters necessary to decode encoded CUs of the slice segment. Dependent slice segments have a reduced header and the first preceding independent slice segment is needed to infer parameters not available in the header of the dependent slice segment.

A set of one independent slice segment and consecutive dependent slice segments (if any available) represent a slice in HEVC. Two neighbour coding units that belong to the same slice can be predicted with each other. On the contrary, if the CUs are not in the same slice, all prediction mechanisms are broken by the slice boundary. Consequently, one coding unit can use data of another CU that is coded in another slice segment if the two slice segments belong to the same slice.

For instance, the frame 206 has been divided into three slice segments. The two first slice segments form one slice and the last slice segment another slice. Slice segments #1 and #3 are also independent slice segments and slice segment #2 is a dependent slice segment. Coding units of slice segment #3 are coded independently from any of the CUs in the slice segment #2 since they are separated by a slice boundary 207. In order to decode the data of dependent slice segment #2, some information in the independent slice segment #1 must be retrieved to infer the encoding parameter of the dependent slice segment #2. In addition, information can be predicted from CUs of the slice segment #1 in order to better compress coding units of the slice segment #2.

According to HEVC, frames may be partitioned in tiles in order to split the video frames into independently coded rectangular areas as illustrated by frame 204. Each tile contains an integer number of CTUs. Inside the tiles, CTUs are scanned in raster scan order. Similarly to slice boundaries, tiles break all prediction mechanisms at their boundaries. HEVC tiles make parallel encoding and decoding of the frames possible. According to HEVC, tiles are defined in the Picture Parameter Set (PPS) NAL unit which is used to initialize the decoding process. PPS NAL unit includes syntax elements that specify the number of tile rows and the number of tile columns in the picture and their associated sizes. The tile locations (offset in bits) in one slice segment are identified with syntax elements available at the end of the slice segment header.

Tiles and slice segments may be jointly used but with some restrictions. One or both of the following conditions must be satisfied:
  all CTUs of one slice (or slice segment) belong to the same tile.
  all CTUs of one tile belong to the same slice (or slice segment).

Thus, one slice (or slice segment) may contain several entire tiles or be only a sub part of single tile. Also, a tile may contain several entire slices (or slice segments) or only be a subpart of a single slice (or slice segment).

HEVC also provides a wavefront parallel processing tool which consists in processing each CTU line in parallel with two CTUs delay. For example, the first CTU line of frame 209 is encoded in a dedicated thread. Once the second CTU of this line is processed, another thread starts processing the first CTU of the second line. The encoding context of the top right CTU (i.e. the second CTU of the first CTU line) is used. All CTUs processed in one thread form a wavefront substream and may be embedded in one dependent slice segment NAL unit. On the decoder side, the dependent slice segments are processed also in parallel with two CTU delay between each wavefront substream.

H.264/AVC provides a feature for processing NAL units of access units that are not in the normative order. This feature is associated with the Arbitrary Slice Order (ASO) coding tool that makes it possible to process any slice of one frame in any order. ASO is available only in specific profiles of the standards (Baseline and Extended). Depending on the value of the "profile-idc" SDP parameter (which specifies the H.264/AVC profile of the video stream), any NAL units order may be employed in one access unit.

The decoder reordering capabilities are determined by the supported profile. H.264/AVC provides only slice NAL unit which are close to independent slice segments.

The RTP payload for SVC (RFC 6190) specifies the encapsulation process for a scalable video stream that may be sent for instance with several parallel RTP sessions. Each layer of the video sequence is transmitted in one RTP session. The RFC introduces a packetization mode referred to as non-interleaved timestamp (NI-T) mode according to which:

1. In each RTP session the NAL units are transmitted in the decoding order as specified in the H.264/AVC specification (normative order).
2. Reordering between RTP sessions is based on the timestamps of the RTP packets. NAL units of the different RTP sessions within the same access unit share the same RTP timestamp. The packetizer adds empty NAL units for the RTP session that do not specify NAL units for a specific RTP timestamp defined in another RTP session.
3. The reordering of the different RTP session is based on the session dependency order starting from the lowest RTP session.
4. The NAL units of one access unit are then ordered in the decoding order based on the NAL unit types of the different NAL units.

RFC 6190 specify an FMTP parameter ("sprop-no-NAL-reordering-required") that makes it possible to skip the last reordering stage #4.

When several slices are used for one coding picture in an access unit, each NAL unit corresponding to the slice is transmitted in the decoding order within the RTP session. No reordering is required for these NAL units. The "sprop-no-NAL-reordering-required" parameter makes it possible to avoid some reordering. However, it gives no information concerning the reordering process for NAL units corresponding to subparts of a coding picture.

When several video coding layer (VCL) NAL units are generated for each picture, which is typically the case when partitioning tools are used for parallel processing, the partitions of the picture (i.e. slices segments which contain slice data, tiles data or wavefront substream data) are encoded at different processing times depending on the picture's content.

For instance, a tile containing very complex or high frequency textured pixels consumes more processing time than a tile composed of low frequency textured pixels. As a consequence, the VCL NAL units composing the picture may be generated in an order different from the normative order provided in the HEVC specification. For generating a conformant bitstream, these NAL units should be reordered before being delivered to the decoder. Non VCL NAL units may be available for each access unit. In what follows, only the order of VCL NAL units is considered.

This increases the latency of the streaming and requires processing resources on the sender device embedding the encoder or on the receiver device embedding the decoder.

Thus, there is a need for making delivery of VCL NAL units to a decoder in an order different from the normative order imposed by the standard.

The Invention lies within this context.

SUMMARY OF THE INVENTION

According to a first aspect of the invention there is provided a method of encapsulating data units of at least one encoded video frame into a data stream, said data units representing frame portions of the video frame, the method comprising the following steps:

determining whether said data units are likely to be received by a receiver according to an order of the data units different from a nominal data unit decoding order, and encapsulating said data units into said data stream, wherein said data stream is associated with an ordering information indicating the compliance of the order of the data units with said nominal data unit decoding order.

A method according to the first aspect makes it possible for receivers to declare at transport encoding level that data units, such as NAL units, within one coding picture are not in the normative order and can be reordered at the receiver's end.

The encoder can send information including additional data that describe characteristics the decoder must meet to be able to decode the bitstream without NAL units being ordered in compliance with the nominal ordering.

A method according to the first aspect makes it possible to save processing resources. Useless check and reordering between receiver and decoder can be avoided.

A method according to the first aspect provides flexible transmission with robust and flexible decoders.

Also, a method according to the first aspect provides low latency since there is no need for the server to wait for all tiles and since there is no need for reordering before starting emission.

According to embodiments, said determining step is based on a partitioning configuration according to which said at least one encoded video frame has been partitioned into frame portions.

For example, said determining step is based on an output order of said data units from a parallel encoding process.

According to embodiments, the determining step is based on at least one network condition parameter of a network over which said data stream is to be transmitted.

For example, said frame portions comprise slices and wherein said nominal data unit decoding order is a slice decoding order of the frame specified in an image compression format with which the encoded video frame is compliant.

For example, said frame portions comprise slice segments and wherein said nominal data unit decoding order is an order of the slice segments within a slice.

For example, said frame portions comprise tiles and wherein said nominal data unit decoding order is a tiling order.

According to embodiments, the encoded video frame is of the HEVC image compression format type.

According to embodiments, the data units are encapsulated according to a protocol of the RTP transport protocol type.

For example, said ordering information is incorporated as a parameter of a session description protocol (SDP) document.

For example, said parameter comprises a syntax element which is set to a first value when the video stream conforms to said nominal data unit decoding order and which is set to a second value otherwise.

For example, said parameter comprises a syntax element:
which is set to a third value when the video stream conforms to said nominal data unit decoding order,
which is set to a fourth value when the ordering of the slice conforms with the nominal decoding order but not with the ordering of the slice segments within a slice, and
which is set to a fifth value when the ordering of the slice segments and the ordering of the slices do not conform with the nominal data unit decoding order.

According to embodiments, said parameter comprises reordering information for reordering said data units by a receiver to process the video stream.

For example, said parameter comprises buffering information for buffering said data units by a receiver to process the video stream.

According to embodiments, said parameter comprises structure information relating to a partitioning of said video frame for reordering said data units by a receiver to process the video stream.

For example, said parameter is part of a session description protocol (SDP) document transmitted in response to a message from said receiver indicating its ability to process said video stream.

According to embodiments, the data units are encapsulated according to an ISO base media file (BMF) format.

For example, said ordering information is put in header information of an ISO Base Media file.

For example, said ordering information is incorporated as a decoder configuration parameter of an ISO Base Media file.

For example, said ordering information is incorporated as a sub sample information parameter.

For example, said parameter comprises a syntax element which is set to a sixth value when the video stream conforms to said nominal data unit decoding order and which is set to a seventh value otherwise.

For example, said parameter comprises a syntax element:
which is set to an eighth value when the video stream conforms to said nominal data unit decoding order,
which is set to a ninth value when the ordering of the slice conforms with the nominal decoding order but not with the ordering of the slice segments within a slice, and
which is set to a tenth value when the ordering of the slice segments and the ordering of the slices do not conform with the nominal data unit decoding order.

According to embodiments, said parameter comprises reordering information for reordering said data units by a receiver to process the video stream.

For example, said parameter comprises buffering information for buffering said data units by a receiver to process the video stream.

According to embodiments, said parameter comprises structure information relating to a partitioning of said video frame for reordering said data units by a receiver to process the video stream.

BRIEF DESCRIPTION OF THE DRAWINGS

Other features and advantages of the invention will become apparent from the following description of non-limiting exemplary embodiments, with reference to the appended drawings:

FIGS. 7-9 illustrate ISO BMF encapsulation according to embodiments;

DETAILED DESCRIPTION OF THE INVENTION

Figure 2:
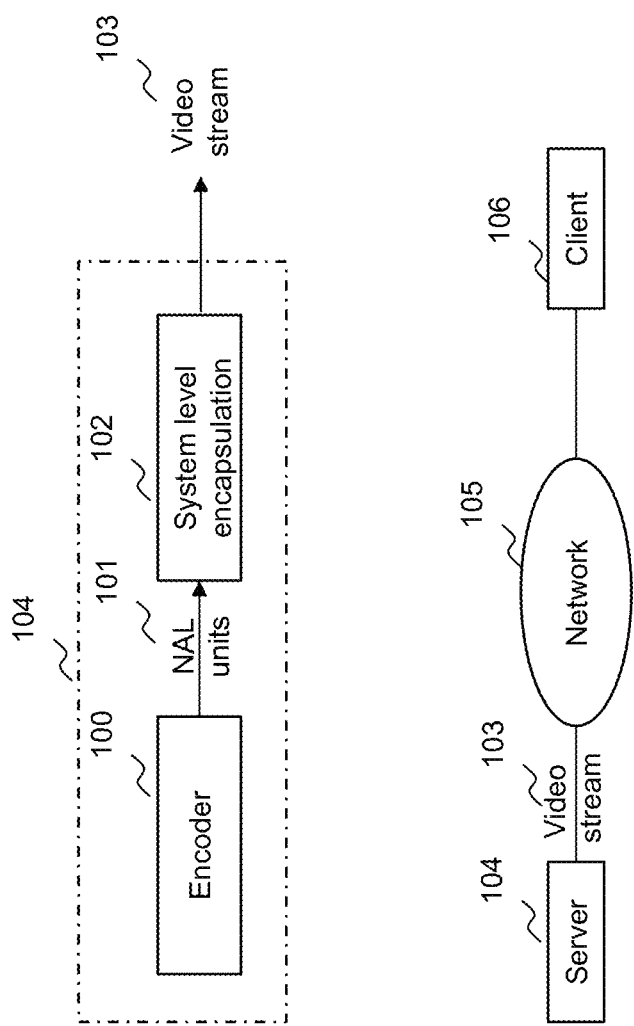
FIG. 2 illustrates a system according to embodiments.

A system according to embodiments is represented in FIG. 2. A block based encoder 100, for example an HEVC encoder (or the like), is configured for compressing a video sequence. The encoder uses partitioning mechanisms and several Network Abstraction Layer (NAL) units are generated for each frame of the input video sequence which forms the elementary stream 101.

The elementary stream is then used as the input for an encapsulation unit 102. The video stream 103 generated by the encapsulation unit comprises a set of encapsulated NAL units with additional data describing the generated video stream. The encapsulation unit 102 is further described in what follows, with reference to FIG. 3. The generated video stream can then be transmitted between a server 104 and a client 106 over a network 105.

Figure 1:
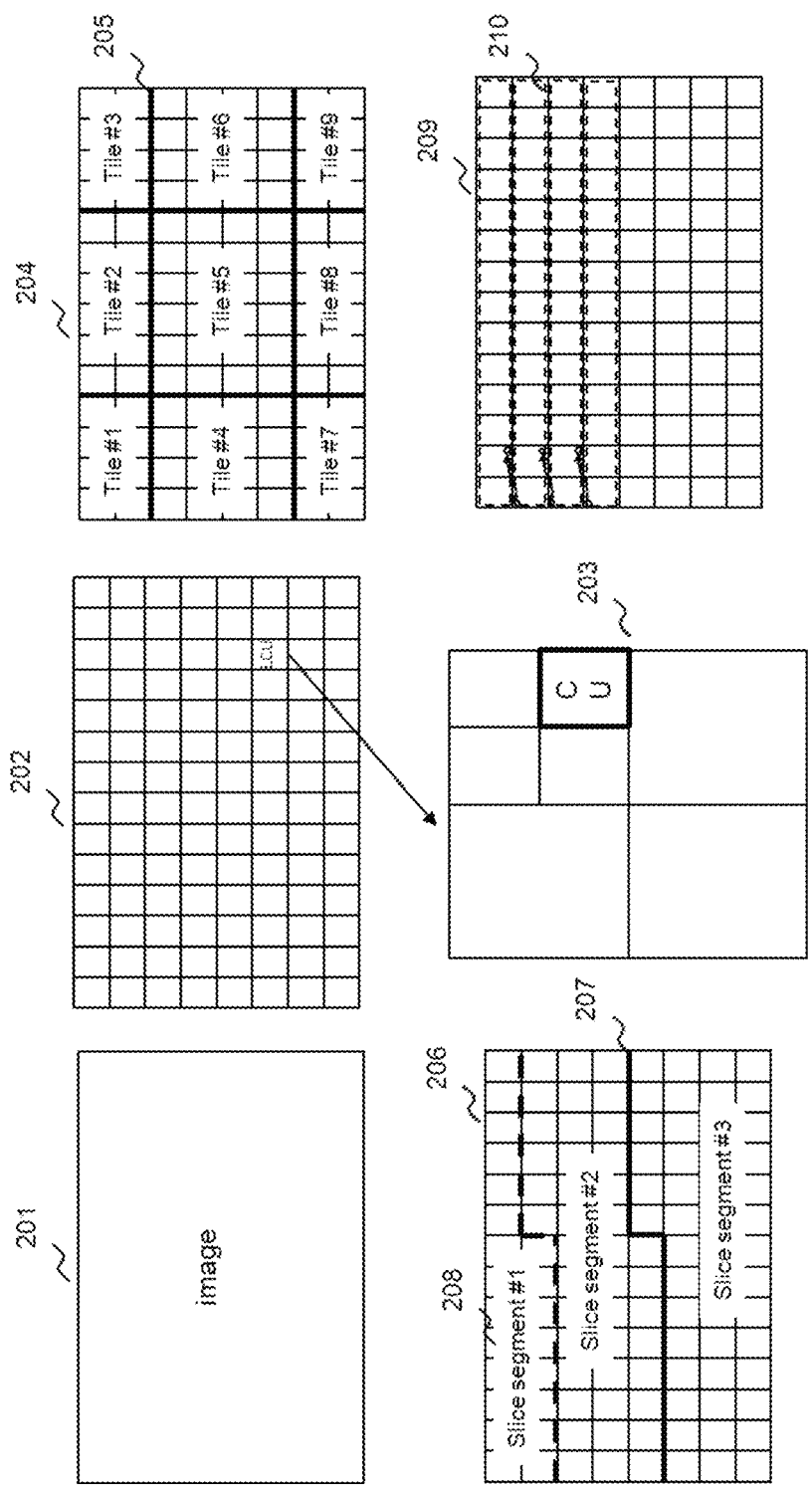
FIG. 1 illustrates the image coding structure used according to HEVC.
Figure 3:
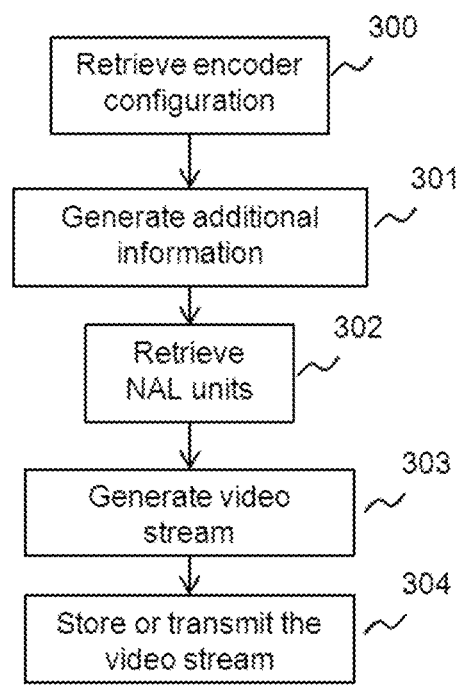
FIG. 3 is a flowchart of steps of an encapsulation process according to embodiments.

The general principle of the encapsulation process is described with reference to FIG. 3. First, the video (elementary) stream coding configuration is retrieved (step 300). It comprises the partitioning configuration for each frame of the video sequence. In particular, it comprises the type (independent or dependent) of slice segments employed for each encoded frame and also a maximum number of NAL units generated for each frame. In addition, the tile, slice and wavefront configuration is determined. For instance, encoding configuration of frame 206 of FIG. 1 indicates that the frame is split in two slices: the first slice includes two slice segments (one independent slice segment and one dependent slice segment) and the second slice is composed of a single independent slice segment.

Next, additional data is computed (step 301) to represent the video stream characteristics. According to embodiments, these additional data are obtained from information gathered during step 300. This additional data includes information that specifies the expected NAL unit "disorder" in each picture (i.e. the fact that the order that is expected for the generation of the NAL units is different from the order of the standard or the nominal decoding order). According to other embodiments, information from the network such as the loss rate or the rate of packet retransmission could be used to determine these additional data. It also determines the receiver reordering capabilities required to process the generated bitstream. Depending on the encapsulation format (for instance RTP or ISO BMF), the additional information is provided separately from the encoded NAL units.

The additional information may be transmitted in SDP document for RTP encapsulation.

The additional information may also be added in an ISO BMF box for transmission of mp4 media segments with DASH.

The NAL units generated by the encoder are retrieved during step 302 and then prepared (step 303) for the streaming. In the case of RTP encapsulation, it comprises embedding each NAL unit in at least one network packet. For ISO BMF, it comprises generating the boxes that describe the elementary streams.

This step may include adding information for rearranging the NAL units in the normative order.

Thus, the obtained video stream comprises a set of NAL units and additional information indicating that some access units of the bitstream contains out of order NAL units (i.e. NAL units that are not ordered according to the normative order (nominal order)). The additional information may also specify some reordering capability requirements for the decoder. The video stream is then either transmitted (step 304) to the client or stored for later transmission.

Figure 4:
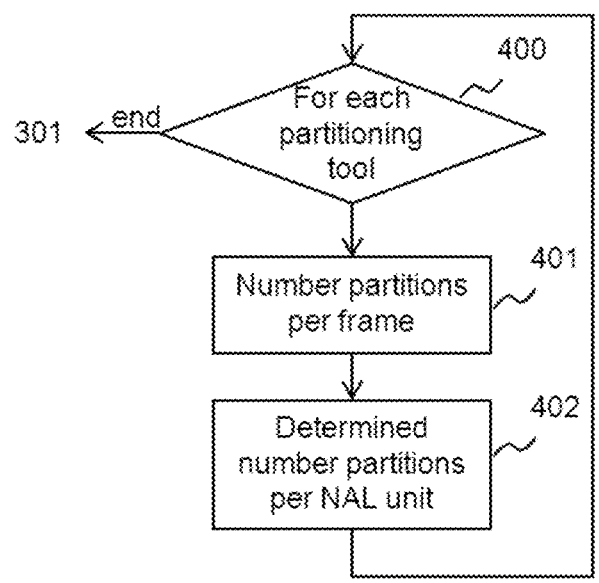
FIG. 4 is a flowchart of steps of an elementary stream configuration according to an embodiments.

The elementary stream configuration is described with reference to FIG. 4.

The elementary stream configuration is determined in order to estimate the possible reordering strategy that can be performed by the receiver. Indeed, if the elementary stream employs partitioning tools that make parallel decoding of NAL unit possible (such as wavefront or tile partitioning), it is very likely that the decoder which implements such parallel processing is able to handle NAL units in one picture in a non-normative order. For this reason, step 300 aims at identifying what the configuration used for the partitioning tools is and also identifying how each partition is embedded in a NAL unit. Indeed, several slice segments (and therefore NAL units) are used for each frame (otherwise, there is a single NAL unit per frame and no reordering is necessary).

The determination of the coding configuration of the elementary stream comprises successively applying steps 401 and 402 for each partitioning tool. In the case of HEVC, tile, slice and wavefront partitioning tool are considered. For other block based encoders, any coding tools that create subparts of a picture that may be processed in parallel (independently or dependently) are considered.

The number of partitions i.e. the number of tiles, slices or wavefront substreams is extracted from each picture of the encoded video stream. Since the number of partitions may vary from one frame to another, the minimum and maximum partition numbers are stored in memory. Secondly, it is computed during step 402 the number of NAL units that are comprised in each partition.

The parameters obtained during steps 401 and 402 are used in step 301 for generating the additional information of the video stream.

The protocol used for the transport of the data in this network may be RTP ("Real-time Transport Protocol"). Thus, the network packets are of the RTP type. Each sub part of the HEVC bitstream is encoded in NAL units and embedded in one RTP packet when possible or fragmented in several RTP packets if the size of the NAL unit is above the MTU (Maximum Transmission Unit) size. The encapsulation process into an RTP stream is described in what follows.

RTP (Real Time Protocol) streaming starts by the exchange of an SDP (Session Description Protocol) document between the server and the client. The SDP describes the streaming characteristics of the stream to be sent. Typically, it indicates the payload format (H.265, H.264 . . . ) of the media stream and also configuration parameters for the network/transport layer. In addition, it includes some parameters of the video codec such as the required profile, the transmission mode or information on the coding configuration. These video codec related parameters are defined in the fmtp line of the SDP document. Below is an example of a media representation in SDP:
   m=video 49170 RTP/AVP 98
   a=rtpmap:98 H265/90000
   a=fmtp:98 profile-id=1; tx-mode=SST;

In this SDP example, the first line indicates that the media stream is a video with a payload type equal to 98. The following line indicates that the media stream having payload type equal to 98 is an H.265 (HEVC) video stream. Finally, the fmtp line contains parameters indicating the profile of the H.265 video stream. The fmtp line is used to convey all parameters related to the coding characteristics of the H.265/HEVC video stream.

In a first alternative embodiment, it may be defined an sprop-in-pic-reorder-flag parameter in the fmtp line that specifies the requirement for reordering NAL units in coded pictures. When equal to 0, the video stream conforms to the normative order of the specification. Otherwise, if equal to 1, the decoder should be able to reorder or at least handle out of order NAL units of one access unit. In one embodiment, when sprop-in-pic-reorder-flag is equal to 1, it is supposed that all NAL units of one coding picture are only independent slice segment NAL units. This parameter is typically used in a declarative form of the SDP. The client requests one streaming session with, for instance, the "DESCRIBE" method of the RTSP protocol and receives in response the SDP of the session. If the client is not supporting the parameters declared in the SDP it should discard the session.

In an offer and answer model, several SDP documents are exchanged between the receiver and the transmitter until an agreement on the streaming session configuration is obtained. In that case, the receiver may specify its decoding capabilities to refine the expected video stream coding configuration. In particular, the receiver may define its reordering capabilities. In this document, reordering capabilities of the receiver refers either to the receiver's depacketizer reordering capabilities or also to the decoder reordering capabilities. It is obviously considered that a decoder of a receiver able to handle NAL units of one access unit in an order different than the normative order without prior NALU rearrangement process is considered as being able to reorder the NAL units.

The dec-reorder-cap parameter is a flag which indicates the receiver additional capabilities regarding NAL unit reordering in one access unit. In a first embodiment, dec-reorder-cap is a flag which shares semantics similar to the semantics of the sprop-in-pic-reorder-flag parameter: when equal to 0 it means that receiver has no reordering capabilities, on the contrary when equal to 1 it means that the receiver is able to reorder the NAL units in each coding picture of the stream with the condition that all VCL NAL units of each access unit are independent slice segment NAL units.

As an SDP negotiation example, a receiver specifies its reordering capabilities with the dec-reorder-cap fmtp parameter in an SDP that is transmitted to the sender. Then the sender compares the required video stream configuration for handling NAL units which are not ordered according to the normative order in one picture, with the encoding configuration of the video sequence. For a pre-encoded (or stored) video sequence, the sender compares its encoding characteristics with the requirements of the dec-reorder-cap parameter. If the requirements are fulfilled, the sender specifies the size of the reordering buffer required for reordering NAL units in one access unit with the sprop-depack-inpic-buf-nalus fmtp line parameter. On the contrary, if the encoding configuration of the video sequence is not matching the criteria indicated in the dec-reorder-cap parameter of the receiver's SDP, the sprop-depack-inpic-buf-nalus parameter is set equal to 0. For a live encoded video sequence, the sender configures the encoder to meet the receiver's requirements and sets the value of the sprop-depack-inpic-buf-nalus parameter accordingly. If the encoder cannot fulfil the requirements the sprop-depack-inpic-buf-nalus is also set to 0. Consequently, when a receiver receives an SDP with a sprop-depack-inpic-buf-nalus parameter greater than 0, it means that some NAL units are disordered within each access unit.

Figure 5A:
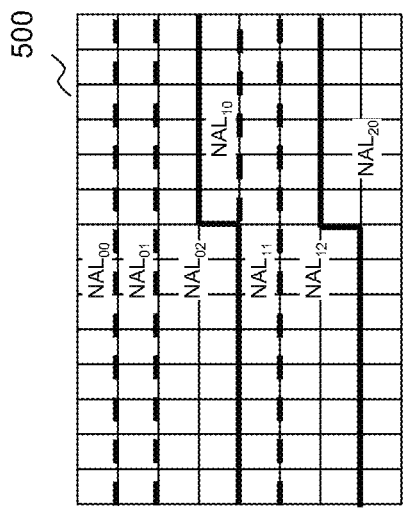
FIGS. 5a-5d illustrate NAL units ordering.
Figure 5B:
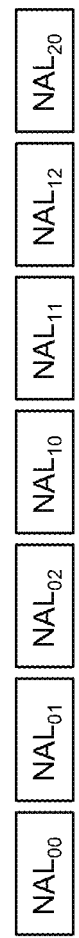

In a second alternative embodiment, the fmtp parameter specifies an sprop-in-pic-reorder-idc parameter that has several possible values, each corresponding to a particular NAL unit disorder in coded pictures of the video sequence. The list of possible values is specified as follows:

0, indicates that the bitstream is transmitted in normative order. The video stream must respect the normative decoding order. For instance, the FIG. 5a represents a video frame 500 partitioned into 3 slices: the first and second slices are further divided into 3 slice segments ($NAL_{00}$ to $NAL_{02}$ and $NAL_{10}$ to $NAL_{12}$). The last slice is embedded in a single independent slice segment. In that case, the normative order as represented in FIG. 5b should be employed.

Figure 5C:
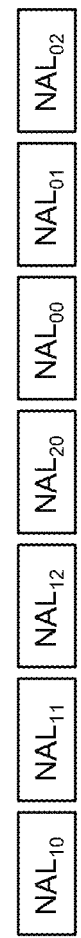

1, indicates slice based disorder, i.e., any NAL unit order within one picture is permitted with following constraint: for each slice of the frame, the NAL units corresponding to the slice segments forming the slice should be transmitted in the correct order. For instance, FIG. 5c is one possible NAL unit order for frame 500. It is important to notice that the appearance order of NAL units composing one slice is conformed to the normative order. However, the appearance order of the slice is different from what is expected by the HEVC specification. Such sprop-in-pic-reorder-idc value is typically suitable for decoders that perform a slice based parallel processing. The data within one slice unit is provided in a correct order but the different slices are provided to the decoder in any order. The bitstream provided in FIG. 5d is also not supported since slice segments within one slice are out of order.

Figure 5D:

2, indicates slice segment based disorder: any appearance order of NAL units within one picture is allowed and thus the bitstream of FIG. 5d is supported. This mode is adapted to very flexible decoders that perform in depth analysis of NAL units to identify the appropriate decoding order.

For SDP negotiation, the parameter dec-reorder-cap now defines the receiver reordering capability with following semantics for each value:

0, indicates no reordering capabilities. The receiver is thus able to process the video stream in an RTP session for which the sprop-in-pic-reorder-idc parameter is equal to 0.

1, indicates slice reordering capability. The receiver is thus able to process the video stream in an RTP session for which the sprop-in-pic-reorder-idc parameter is equal to 1.

2, indicates slice segment reordering capability. The receiver is thus able to process the video stream in an RTP session for which the sprop-in-pic-reorder-idc parameter is equal to 2.

In a third alternative embodiment, the receiver reordering capabilities are precisely defined depending on the partitioning mechanism employed and the number of partitions defined per slice segment. As for the previous embodiment, the capabilities also depend on the type of slice segment. The dec-reorder-cap parameter indicates the receiver reordering capabilities as a set of:

reordering capabilities level/index,
a partitioning mode,
a partitioning configuration requirement and,
a set of optional reorder configuration parameters The following ABNF (RFC 5234) syntax is proposed in the table for these new parameters:

dec-reorder-cap="{" reorder-cap-pt*("," reorder-cap-pt)"}"
reorder-cap-pt=reorder-level-idc ":" ("w"/"t") ":" min_part_per_reorder_unit:*(";" reorder-param)
reorder-param=depack-inpic-buf-nalus/depack-inpic-buf-size/max-nalu-reorder-unit/max-reorder-unit-bytes The set of capability points expressed by the dec-reorder-cap parameter is enclosed in a pair of curly braces ("{ }"). Each set of two consecutive reorder capability points is separated by a comma (','). Within each capability point, each set of two consecutive parameters, and when present, their values, is separated by a semicolon (';').

Each set of reordering capability point (reorder-cap-pt) starts with an indication of the reordering capability level (reorder-level-idc parameter). This parameter may have at least three values (0, 1 or 2) with the same semantics as described for the sprop-in-pic-reorder-idc parameter of the previous embodiment. It is then followed by a partition tool requirement the type of which is specified either by the values "w" or "t". The "w" value indicates wavefront partition tool and "t" the tile partition tool. The present embodiments are described in the HEVC context and thus, there is no other partition tool. However, for a different codec, any other partition tool can be specified. Slice partitioning is not considered since for HEVC, slice partitioning is completely defined by the slice segments partitioning which is specified with reorder-level-idc parameter.

The next parameter is min_part_per_reorder_unit which defines a minimum number of partitions required per reordering unit. The reorder unit is a set of NAL units that are determined depending on the value of the reorder-level-idc parameter. If the reorder-level-idc parameter is equal to 0 or 2 it corresponds to one slice segment NAL unit of the access unit. Otherwise if the reorder-level-idc parameter is equal to 1 it corresponds to a set of slice segment NAL units corresponding to one slice of the picture, i.e., one independent slice segment NAL unit followed by 0 or several dependent slice segment NAL units. The min_part_per_reorder_unit parameter has a value greater or equal to 0. When it is greater than 0, it indicates that at least one complete partition is embedded in each reorder unit. According to other embodiments, the value may specify the number of partitions available in each reordering unit. When the parameter is equal to 0, the partition is spread out over several reordering units. Thus, it indicates that the reordering unit requirement does not necessitate having a complete partition in the considered reordering unit.

Next, a set of optional reorder parameters (reorder-param) may further specify reordering capabilities of the receiver. Below is the list of the parameters that may be defined:

depack-inpic-buf-nalus: specifies the maximum number of NAL units of one access unit (AU) that precede a NAL unit of the same AU in the reordering buffer in the reception order and follow the NAL unit in decoding order. The value of depack-inpic-buf-nalus parameter should be an integer in the range of 0 to 32767 for instance.

depack-inpic-buf-bytes: specifies the required size of the reordering buffer in bytes. The value is an integer in the range of 0 to 4294967295.

max-nalu-reorder-unit: specifies the maximum number of NAL units in one reordering unit. When the reorder-level-idc parameter is equal to 0 or 2, the max-nalu-reorder-unit parameter must be equal to 0. Otherwise the max-nalu-reorder-unit parameter is an integer in the range of 0 to 32767.

max-nalu-reorder-unit-bytes: specifies the maximum size of NAL units in one reordering unit. The max-nalu-reorder-unit parameter is an integer in the range of 0 to 4294967295.

The parameters defined in dec-reorder-cap have also their equivalent for SDP declarative mode:

sprop-min-part-per-reorder-unit: same semantics as min-part-per-reorder-unit-flag. It defines the minimum number of partition per reorder unit. The partition type is identified by the sprop-segmentation-id parameter (cf. http://tools.ietf.org/html/draft-ietf-payload-rtp-h265-01). When equal to 2 (resp. 3), the partition type is "tiles" (resp. wavefront substream). When sprop-segmentation-id is equal to 0 or 1 sprop-min-part-per-reorder-unit-flag should not be specified or considered as invalid or equal to 0.

sprop-depack-inpic-buf-nalus: similar semantic as depack-inpic-buf-nalus.

sprop-depack-inpic-buf-size: similar semantic as depack-inpic-buf-size.

sprop-max-nalu-reorder-unit: similar semantic as max-nalu-reorder-unit.

sprop-max-reorder-unit-bytes: similar semantic as max-reorder-unit-bytes.

The encapsulation process of NAL units in network packet is specified in the IETF draft of HEVC RTP payload. There are three general packetization strategies:

1. Single NAL unit packet: exactly one NAL unit is added into a single RTP packet.

2. Aggregation Packet (AP): Several NAL units fit into a single RTP packet. An AP aggregates NAL units within one access unit in decoding order. Each NAL units forms an aggregation unit.

3. Fragmentation Units: The NAL unit is greater than the maximum RTP packet size. The NAL unit is split into several part of size equal to MTU size and embedded in one Fragmentation unit which is a NAL unit with a specific NAL unit type. Some parameters defined in the Fragment Unit header identify the first and last fragment unit of the fragmented NAL unit.

Two transmission modes are considered:
single session transmission (SST) a single RTP session is used of transmission of HEVC bitstream and
multi session transmission mode (MST) more than one RTP session is used for transmission of HEVC bitstream.

The transmission order of the NAL units of an HEVC bitstream is the decoding order except when the transmission mode is MST or when sprop-depack-buf-nalus parameter is greater than 0. In such cases (MST mode or sprop-depack-buf-nalus=0) the packetizer adds a Decoding Order Number (DON) field in the NAL units which enables the depacketizer to retrieve the decoding order of the NAL units. The depacketizer arranges the NAL units in ascending order of DON before the decoding process. When the transmission order is the decoding order, the depacketizer relies on RTP sequence numbers of RTP packets which contains the NAL unit. The order of NAL units within the RTP packet is also the decoding order.

The decoding order of NAL unit within an access unit may be different than the normative order. As a consequence, when the sprop-in-pic-reorder-idc parameter is greater than 0, the NAL units order may be different. Two cases are distinguished:

The transmission mode is SST or the sprop-depack-buf-nalus parameter is equal to 0. If the sprop-depack-inpic-buf-nalus parameter is equal to 0, the transmission order of NAL unit is the decoding order. Otherwise, if the sprop-depack-inpic-buf-nalus parameter is greater than 0, the transmission order may differ from the decoding order for NAL units in one coding picture and a maximum number of sprop-depack-inpic-buf-nalus NAL units needs to be buffered for reordering the NAL units in decoding order. It is up to the receiver to perform the reordering of the NAL units of the bitstream by analysing the content of the NAL units in each access unit.

The transmission mode is MST or sprop-depack-buf-nalus is greater than 0. The decoding order of NAL units is specified using the DON fields. The first VCL NAL unit of one access unit should have a DON greater than and different from the DON of the last VCL NAL unit in previous access unit in decoding order. The DON of one VCL NAL unit within an access unit different than the first VCL NAL unit should be equal to the previous VCL NAL unit's DON when the NAL unit may be reorder by the receiver. Otherwise, the DON should be set in order to retrieve the decoding order of the NAL unit The standard protocol employed to transmit the media presentation over the IP network may also be DASH: Dynamic Adaptive Streaming over HTTP. This standard has recently emerged and makes it possible to create an association between a compact description of each media content of the media presentation and HTTP addresses. Usually, this association is described in a file called a manifest file. In the context of DASH, this manifest file is a file also called the MPD (Media Presentation Description). When the MPD is sent to the client, the description of each media content can be easily known by the client. By reading the manifest, the client is aware of the kind of media contents proposed in the media presentation and is aware of the HTTP addresses for downloading the associated media contents. Therefore, it can decide which media content to download (via HTTP requests) and to play (decoding and play after reception of the media data segments).

In addition to this association, the DASH standard proposes to split each media content into small periods of time. The time decomposition is added in the MPD file. The MPD file is therefore a file that describes the association between HTTP addresses and the compact description of each media content over a small period of time. Thus the client can download the desired media contents of the media presentation over the desired period of time.

In the context of DASH, File formats are used to encapsulate and describe encoded bitstreams as is. In particular the ISO Base Media File Format (ISO BMFF) is well-known to provide flexible and extensible format to describe timed encoded media bitstreams either for 'local' storage or access via a network or other stream delivery mechanism.

This file format is object-oriented. It is composed of building blocks called "boxes" that are sequentially or hierarchically organized and that define parameters of the encoded timed media data bit-stream such as timing and structure parameters. According to this file format, the timed media data bit-stream is contained in a data structure referred to as mdat box that is defined in another data structure referred to as track box. The track represents a timed sequence of samples where a sample corresponds to all the data associated with a single timestamp that is to say all the data associated with a single frame or all the data associated with several frames sharing the same timestamp (for scalable content).

The encapsulation of NAL units into the ISO BMFF file format is described in what follows.

Figure 7:
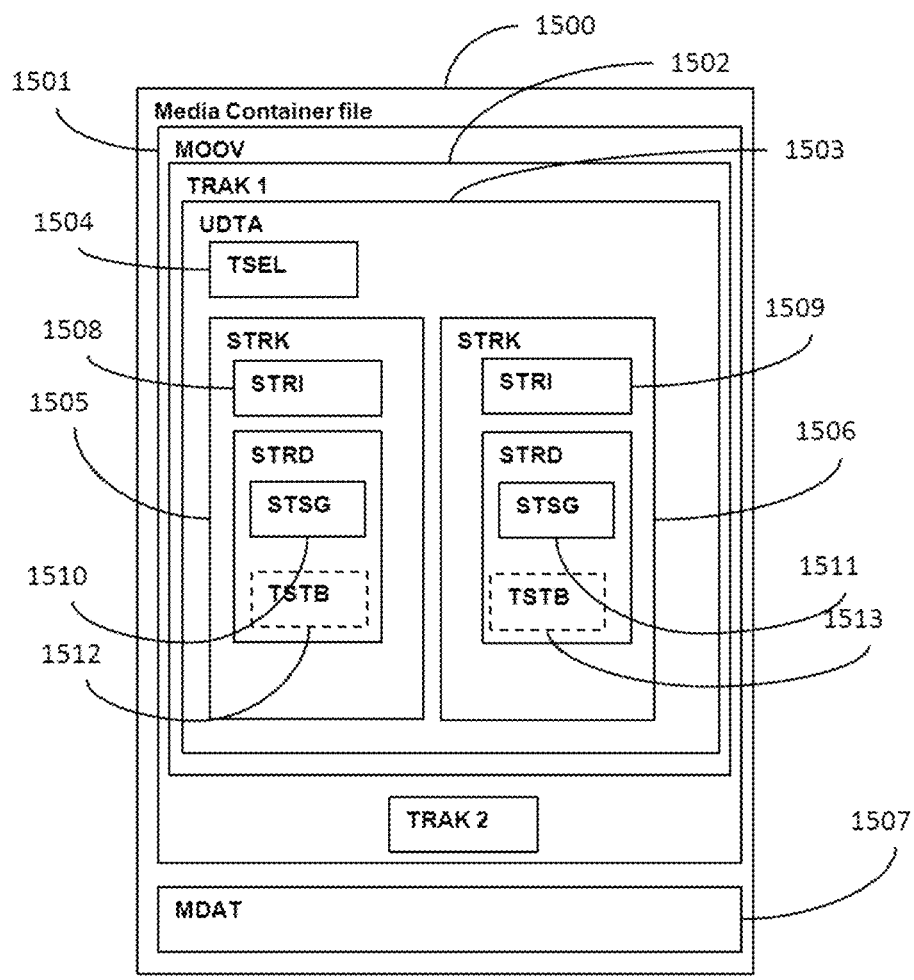

FIG. 7 represents the ISO BMF encapsulation employed for one video track (1502) built from the HEVC elementary bit-stream. In this embodiment, tile partitioning tool is considered. The invention could be also extended to wavefront parallel processing. Since the HEVC video encoder has parallelization features, the mp4 writer can decide to encapsulate encoded NAL units as soon as they are generated, for example to minimize latency and buffering to rapidly generate mp4 segments for live DASH transmission.

According to embodiments, we consider tile-based parallelization, but embodiments of the invention can be implemented with slice-based or CTU-row based parallelization. An amendment of ISO/IEC 14496 Part 15 indicates how to describe tiles in ISO BMFF for HEVC with sub tracks, as illustrated in FIG. 7.

The tile description and grouping information can be put as part of user data (1503) at the same place as the track selection box (1504) since it provides choices to the user (or client) of the encapsulated file. The ISO Base Media File Format defines boxes to describe sub-tracks. Sub tracks (1505, 1506) are used to assign parts of tracks to alternate and switch groups in the same way as (entire) tracks can be assigned to alternate and switch groups.

A generic syntax is provided for sub-track description as the boxes of FIG. 7 (with 1512 and 1513 that are tile specific). The standard indicates that these generic boxes have to be specified for each media format (for example SVC, MVC . . . ). Here, the input video elementary stream is considered to be a tiled HEVC or tiled scalable HEVC bitstream. The sub track may be ignored and tiles may be described via the sample grouping mechanism with NAL unit mapping to tile descriptors.

Figure 10:
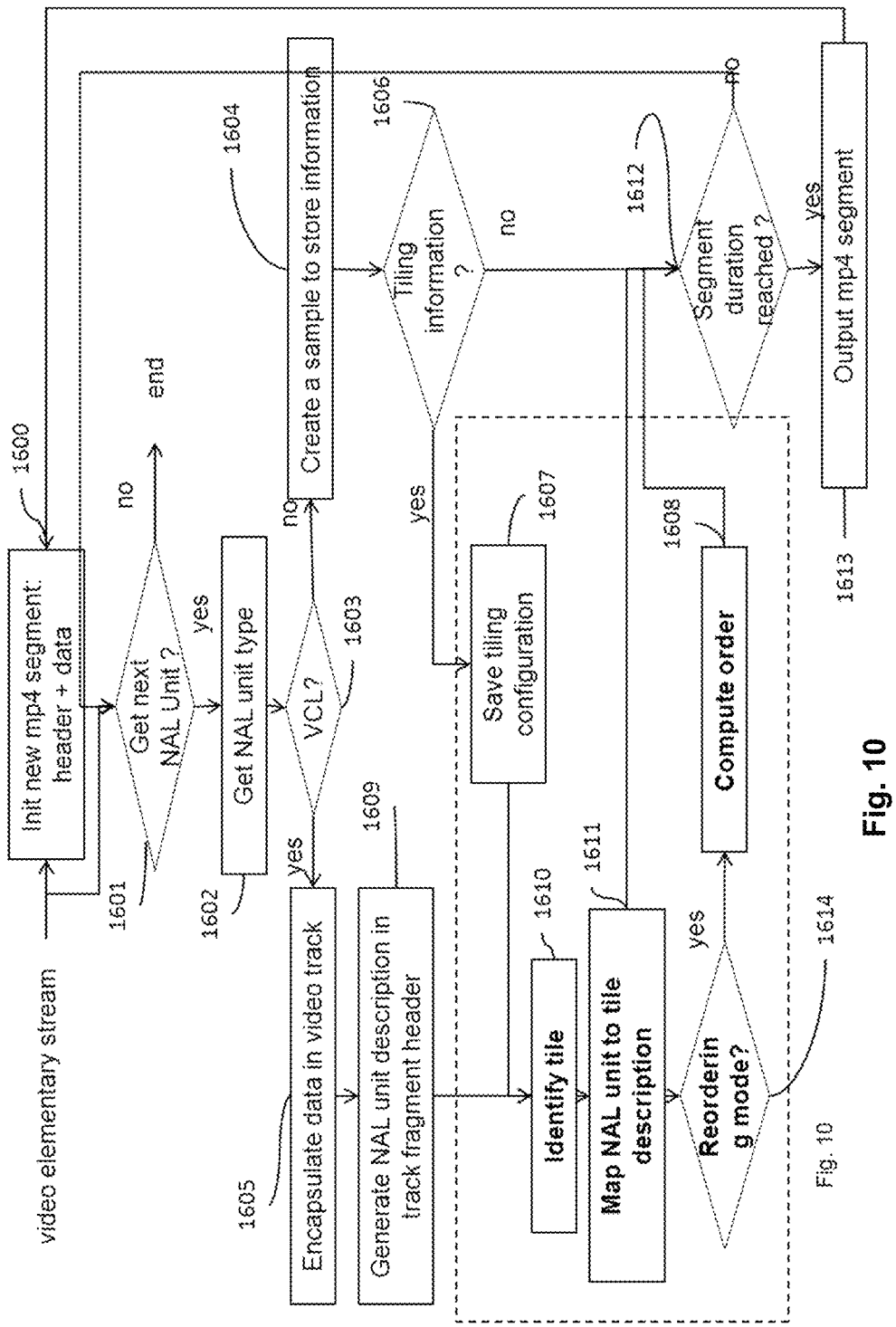
FIG. 10 is a flowchart of steps of an encapsulating process of a video elementary stream into mp4 segments.

The encapsulation step 102 (FIG. 2) performed on the server side (or in the device capturing the video) to encapsulate the video elementary stream into mp4 segments is described in details with reference to FIG. 10. Encapsulation can be done indifferently at capture time or a posteriori when preparing content for upload to a streaming server. An mp4 segment is an addressable entity made up of a header part and a data part. Mp4 segments have a duration that can be the same all along the sequence or variable. We assume here that the segment duration is constant along time and is provided as an initialization parameter of the server in charge of encapsulating the data. Having variable duration would work the same way as steps of FIG. 10. The encapsulation process starts by the initialization of the first mp4 segment (step 1600). During the initialization file, the mp4 writer prepares a sub sample information box to describe the organization of the group of NAL units, into tiles in our preferred embodiment. The version number of this subs box is set to the value 2 to indicate that order information is provided. In this embodiment, the encapsulation comprises creating a single video track to represent the video elementary stream and all its tiles.

Next, the server receives the next NAL unit generated by the encoder in step 1601. When none can be found (step 1601, false), this means that the end of the video elementary stream has been reached and this terminates the encapsulation process. When a NAL unit is received (step 1601, true), its type is checked (step 1603) to determine whether it contains high level information (non-VCL, Video Coding Layer, step 1603, false) or not (VCL=true in step 1603).

While looking and processing NAL units, the server maintains a current timestamp value corresponding to the video frame being processed. The initial timestamp value is set to 0 and is updated each time a new video frame is detected (from HEVC high level syntax elements like for example the syntax parameters in use to compute the PicOrderCntVal). Both non-VCL and VCL NAL units data are stored as samples in the data part of the video track (step 1604, step 1605).

For non-VCL NAL units, the server creates a sample (step 1604) in the data part of the track with a timestamp value corresponding to current time. It then looks at the specific type of this NAL unit to determine whether it can provide information on tiling configuration (step 1606). This can be for example a NAL unit type equal to PPS_NUT that specifies the tiles horizontal and vertical borders or a specific SEI message with NAL unit type=PREFIX_SEI_NUT that gives information on tiles and/or regions of interest or independently encoded spatial areas of the video. When such NAL unit is available, the server saves the obtained tiling configuration (step 1607) for future description of video data (described below for steps 1610, 1611). This is done in a tile descriptor like for example the TileRegionGroupEntry of Amd3 of ISO/IEC 14496 Part 15. It could also create the corresponding sub track during the same step 1607 (step 1505, step 1506 in FIG. 7) that will describe the tiles or independently encoded spatial parts, one per described tile or spatial part.

For VCL NAL units, once the data are stored in the data part of the video track (step 1605), the mp4 writer generates the header part of the track or track fragment (step 1609) for the current video data. For that, it stores in a track header (element 1502 in FIG. 7) or in a track fragment header the byte positions for the current NAL unit, for example in the sample size box 'stsz' or in Track Run box ('trun'). It also stores the timing information in dedicated boxes to reference the data (for example the composition time to sample 'ctts' and decoding time to sample 'stts' boxes).

Next, it identifies, when tiling information is present (step 1606, true) and saved (step 1607), from which tile the current NAL unit comes from (step 1610). This search can be based for HEVC video elementary streams on the slice segment address provided in the HEVC slice segment header. Given the slice segment address, the tile configuration, the tile index can be deduced.

When found, the current sample is associated (step 1611) with the tile descriptor recorded during step 1607 for the identified tile. In the meantime, the mp4 writer can check whether the tiles are generated in order or not.

Next, depending on the encapsulation mode (test 1614), the mp4 writer can set the in_order_flag 902 of the 'subs' box initialized in step 1600. The association of the sample to the tile descriptor consists in a subsample grouping mechanism, the subsample being the slice segment conveyed by the current NAL unit. This slice segment can cover the whole tile or be a part of the tile (i.e. the tile would contain more than one slice segment).

Depending on the configuration, during step 1611 the mp4 writer also generates the value of the disorder level 903. For example the value 0 indicates no information on the disorder; 1 indicates that slices are out of orders and 2 indicates that tiles are out of order.

This linking step 1611 may also update the prepared subtrack when used. Once linked, the mp4 writer continues the encapsulation by checking whether current segment should be finished (step 1612: current timestamp is greater than pre-defined segment duration). In such case, the mp4 segment is stored as ready for streaming on the server in 1613. The server iterates by initializing a new mp4 segment (1600: creating a header part to describe video data and a data part to store the video data). When in reordering mode (step 1614, true), the mp4 writer computes the HEVC compliant tile order in 1608 and stores the expected tile order (lexicographical order) in new HEVC specific parameters 901 at the end of the subs box (905 and 907). This order can be determined by the position of the tiles in the sample.

According to embodiments, the encoder generates NAL units only for a spatial part of the video. In such case, there would be holes in the samples (NAL units not covered by the region of interest). The mp4 writer would generate an incomplete file (not covered NAL units would not be encapsulated) and this particular encapsulation can take benefit of the invention by setting the in_order_flag 902 to false and disorder_level 903 to the value 3 corresponding to missing tiles. In this case the optional reordering step 1608 would consist in providing the order of the only encapsulated tiles.

Figure 6:
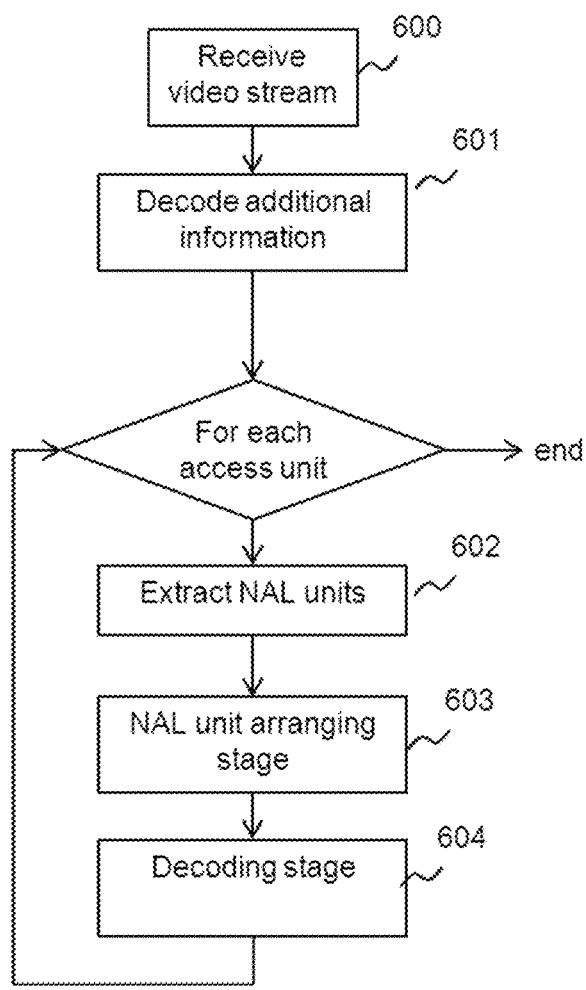
FIG. 6 is a flowchart of steps of a receiving process according to embodiments.

The generated video stream in step 303 (FIG. 3) is transmitted in step 304 to a receiver for which the processing is represented in FIG. 6. The video stream received in step 600 is then processed to extract the additional information and also the NAL units of each access units. The additional information is then decoded (step 601) to identify the characteristics of the transmitted bitstream that may indicate a possible reordering stage. A receiver that cannot fulfill the required capabilities should abort the streaming session since won't be able to handle correctly the bitstream. Otherwise the receiver may initialize its reordering buffer size from decoded additional information.

Next, the receiver applies successively steps 602, 603 and 604 to each access unit of the bitstream. The NAL units corresponding to one access unit are extracted from video stream and stored in a buffer according to the appearance/reception in order to be decoded in step 604.

An optional rearranging step 603 is performed before transmitting the NAL unit to the decoder. It consists in performing the reordering of out of order NAL units in one access unit according to the receiver capabilities. For instance, the receiver may analyse the data in each NAL units to retrieve the address of the first coding tree block of the slice segment in order to reduce the decoding order of each NAL units of the access unit.

In what follows, receiver's processing for RTP protocol and ISO base media file format is described.

For the RTP transport protocol, the SDP is transmitted (step 600) by the server and then parsed (step 601) to extract the fmtp line of the SDP corresponding to the video stream. Depending on the required receiver's capabilities, the receiver determines if the bitstream may be reordered. To do so, the receiver compare its own reordering capabilities with the one described with reordering parameter of SDP such as the sprop-dec-in-pic-reorder-idc parameter and other parameters discussed hereinabove.

If the receiver cannot fulfill the required capability RTP session is aborted. Otherwise, the receiver may initialize its reordering buffer size from the reorder parameter such as the sprop-depack-inpic-buf-size parameter.

Then the network packets are depacketized (step 602) according to the RTP payload specification. In particular, depending on the transmission mode (SST or MST) the NAL units are ordered in the reception buffer according to RTP packet sequence number (SST) or to the DON field specified in the NAL units headers for MST. All NAL units sharing the same RTP timestamp values are considered as in the same access unit. One alternative is to use the Access Unit Delimiter NAL unit which is the first NAL unit (if available) of each access unit of the bitstream.

According to embodiments, the decoder is able to handle out of order NALs unit and thus the reordering step (step 603) is skipped and the NAL units are decoded in step 604. Otherwise, the depacketizer arranges the NAL unit in the reordering buffer to match the supported processing order of the decoder.

This step 603 comprises parsing the slice segment header of each NAL unit of the access unit to extract the address of the first coding tree block (CTB) in the slice segment. Depending on the frame partitioning (tiles or wavefront) the receiver reorders the NAL units. For the SST transmission mode, each NAL unit is analysed since there is no additional information permitting to identify which NAL units are known to be out of order.

The DON fields of two successive NAL units are compared for MST transmission mode. If the two DON fields are equal it means that the two NAL units may be out of order. Otherwise, the NAL units should be decoded in the order of ascending DON.

The use of MST transmission mode may thus be preferred for transmitting the video stream since less consuming in terms of processing. Indeed, possible out of order NAL units are predetermined and also other NAL units need not to be parsed for identify the first CTB address.

When the received media file is conforming to ISO Base Media File Format, it can be streamed between server and client with, for example, the MPEG/DASH standard.

Typically, the initialization information for the video decoder that operates in step 604 is place in an initialization segment in DASH terminology. This initialization segment can be downloaded by the client, its address being obtained from a manifest file describing the media file. For DASH, the manifest file is called the Media Presentation Description (MPD) and is an XML file.

When received at client side, the initialization segment can be parsed in step 601. Typically it contains the header part of the media file, that are descriptive metadata for media data. The mp4 parser then handles the different metadata that are stored in different mp4 boxes. Here, the information on tile order or out-of-order is placed in the sub-sample information box (see 800, FIG. 8) that can be placed in the sample table box (stbl) or in the track fragment box (traf).

The mp4 parser while parsing the initialization segment is informed about the coding format in use through the stsd box describing the visual sample entries. It can have additional sample description in sgpd box(es) such as information concerning tiles if they are in use. It can also get more precise information on sub-samples, i.e. properties for subparts of the samples contained in the media file. This is the object of the subs box 800 and its specialization for HEVC 801.

The parser, still during step 601, gets the version parameter of the subs box. If the version is different than 2, then no information on transmission order is available directly: if the parser wants to determine the transmission order it has to parse multiple boxes or may assume that it is in HEVC decoding order with the risk of parsing or decoding error. When the version of the subs box 900 is equal to 2, the parser then knows that an additional parameter, for example represented on 8 bits as in FIG. 9, has to be parsed. This additional parameter provides the indication on the transmission order. A first bit 902 indicates whether NAL units are organized in the mdat box in decoding order or not. The next 2 bits 903 indicate whether the disorder occurs at slice level or deeper at slice segment level. The remaining bits provide the required buffer size for the mp4 parser or the video decoder that would handle the reordering of step 603. The required buffer size is computed as pow(2, buffering_level).

Optionally for the reordering step 603, hints can be available depending on decoder capabilities. If the decoder can process NAL units in any order, there is no need for the mp4 parser to reorder. Otherwise, the parser has to reorder and can use for that optional information generated by the mp4 server. In the reserved information for HEVC 901, when the subs box is of version 2 an additional flag 905 or 906 is set to indicate whether reordering hints are present or not. When this flag indicates that additional information is present, the parser reads this information in 907 when NAL units groups are tile based (case flags=2) or in 908 when NAL units groups are CTU-row based (case flags=3) or slice-based (case flags=4). A decoding_order_number parameter is provided that indicates the relative order between the NAL units groups declared in the subs box. This facilitates the reordering step 603: the mp4 parser can allocate a buffer of appropriate size as given in 904 and parses NAL units data in the mdat box. Then for each NAL unit a decoding order number can be used to reorder NAL units in ascending decoding order number that will guarantee the HEVC compliant NAL unit ordering. This terminates the optional reordering step 603 and the remaining of the parsing is as usual.

The previous embodiments have been proposed in particular for a single layer video sequence. For single layer video stream one access unit is composed of set of NAL units that are used for decoding one coded picture. For scalable video stream, one access unit comprises a set of NAL units that encode a set of coded pictures which share the same output time. Each coded picture belongs to one scalable layer of the video stream.

As for one layer video stream, the processing of each frame may be parallelized and in addition each layer maybe processed also in parallel. Also the NAL units corresponding to each picture of each layer maybe also outputted out of order. RTP protocol for scalable video stream (for example RFC 6190 for H.264/SVC) provides a method to reorder the NAL units of different layer in one picture. The method described in previous sections is thus applied to each coded picture of each layer. The receiver reordering capabilities is defined for each layer of the video sequence.

Figure 11:
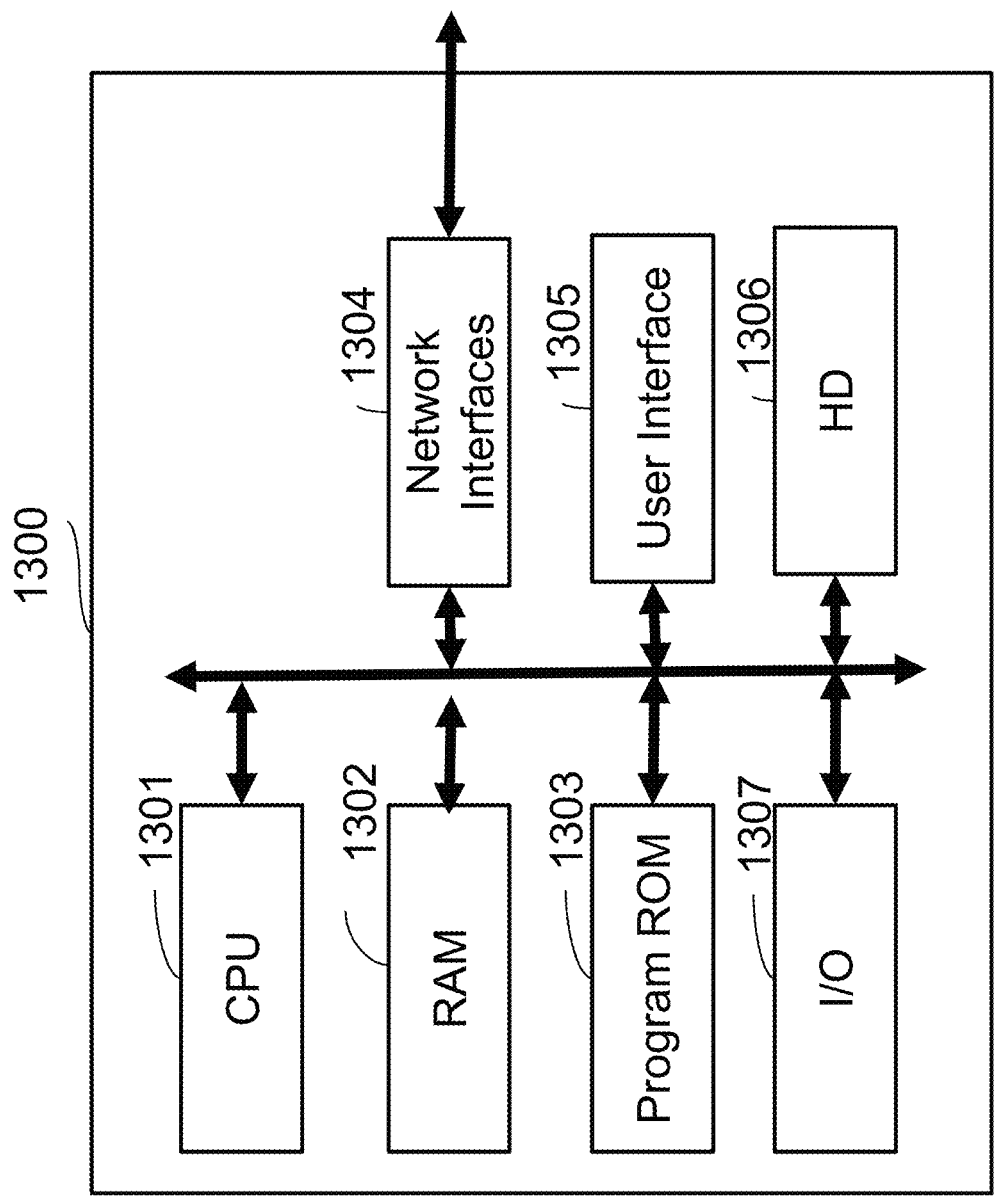
FIG. 11 illustrates a device according to embodiments.

FIG. 11 is a schematic illustration of a device according to embodiments. The device comprises a RAM memory 1302 which may be used as a working memory for a control unit 1301 configured for implementing a method according to embodiments. For example, the control unit may be configured to execute instructions of a computer program loaded from a ROM memory 1303. The program may also be loaded from a hard drive 1306. For example, the computer program is designed based on the flowcharts of FIGS. 3, 4 and 10 and the above description.

The device also comprises a network interface 1304 which may be a single network interface, or comprise a set of network interfaces (for instance several wireless interfaces, or several types of wired or wireless interfaces). The device may comprise a user interface 1305 for displaying information to a user and for receiving inputs from the user.

The device may also comprise an input/output module 1307 for receiving and/or sending data from/to external devices.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in practicing the claimed invention, from a study of the drawings, the disclosure and the appended claims.

For example, according to embodiments, disorder of the data units (e.g. NAL units) is due to bad network conditions. The transmitter may send the data units according to the normative order (i.e. the expected decoding order), but the network conditions may be such that some data units are delayed. Some data units may also be lost and necessitate resending. In that the latter case, resent data units arrive in disorder on the receiver side.

Therefore, the transmitter may check the network conditions and decide to transmit ordering information to the receiver based on these network conditions. Thus, the receiver may be informed of the fact that it may receive the data units in an order different from the nominal decoding order. For example, the transmitter may check the data unit loss rate over the network or any other network condition parameter.

In the claims, the word "comprising" does not exclude other elements or steps, and the indefinite article "a" or "an" does not exclude a plurality. A single processor or other unit may fulfill the functions of several items recited in the claims. The mere fact that different features are recited in mutually different dependent claims does not indicate that a combination of these features cannot be advantageously used.

The invention claimed is:

1. A method of encapsulating data units of at least one encoded video frame into a data stream, said data units representing frame portions of the video frame, the method comprising the following steps:

determining whether said data units are capable of being decoded by a receiver according to an order of the data units different from a nominal data unit decoding order, and encapsulating said data units into said data stream, wherein said data stream is associated with an ordering information indicating the compliance of the order of the data units with said nominal data unit decoding order, the ordering information being set as follows:

a first value when the video stream conforms to the nominal data unit decoding order;

a second value when the ordering of the frame portions conforms with the nominal decoding order but not with the ordering of the data units within a frame portion; and a third value when the ordering of the data units and the ordering of the frame portions do not conform with the nominal data unit decoding order.

2. A method according to claim 1, wherein said determining step is based on a partitioning configuration according to which said at least one encoded video frame has been partitioned into frame portions.

3. A method according to claim 1, wherein said determining step is based on an output order of said data units from a parallel encoding process.

4. A method according to claim 1, wherein said determining step is based on at least one network condition parameter of a network over which said data stream is to be transmitted.

5. A method according to claim 1, wherein said frame portions comprise slices and wherein said nominal data unit decoding order is a slice decoding order of the frame specified in an image compression format with which the encoded video frame is compliant.

6. A method according to claim 1, wherein said frame portions comprise slice segments and wherein said nominal data unit decoding order is an order of the slice segments within a slice.

7. A method according to claim 1, wherein said frame portions comprise tiles and wherein said nominal data unit decoding order is a tiling order.

8. A method according to claim 1, wherein the encoded video frame is of the high efficiency video coding (HEVC) image compression format type.

9. A method according to claim 1, wherein the data units are encapsulated according to a protocol of the real-time transport protocol (RTP) transport protocol type.

10. A method according to claim 9, wherein said ordering information is incorporated as a parameter of a session description protocol (SDP) document.

11. A method according to claim 10, wherein said parameter comprises reordering information for reordering said data units by a receiver to process the video stream.

12. A method according to claim 10, wherein said parameter comprises buffering information for buffering said data units by a receiver to process the video stream.

13. A method according to claim 10, wherein said parameter comprises structure information relating to a partitioning of said video frame for reordering said data units by a receiver to process the video stream.

14. A method according to claim 11, wherein said parameter is part of a session description protocol (SDP) document transmitted in response to a message from said receiver indicating its ability to process said video stream.

15. A method according to claim 1, wherein the data units are encapsulated according to an International Standards Organization (ISO) base media file (BMF) format.

16. A method according to claim 15, wherein said ordering information is put in header information of an ISO Base Media file.

17. A method according to claim 15 wherein said ordering information is incorporated as a decoder configuration parameter of an ISO Base Media file.

18. A method according to claim 15 wherein said ordering information is incorporated as a sub sample information parameter.

19. A method according to claim 18, wherein said parameter comprises reordering information for reordering said data units by a receiver to process the video stream.

20. A method according to claim 18, wherein said parameter comprises buffering information for buffering said data units by a receiver to process the video stream.

21. A method according to claim 18, wherein said parameter comprises structure information relating to a partitioning of said video frame for reordering said data units by a receiver to process the video stream.

22. A method for processing a data stream having encapsulated therein data units representing frame portions of a video frame, said data units being encapsulated according to claim 1, the method comprising the following steps:

parsing an ordering information indicating the compliance of the order of the data units with said nominal data unit decoding order, and performing a processing of the data stream based on said ordering information, wherein the ordering information is set as follows:

a first value when the video stream conforms to the nominal data unit decoding order;

a second value when the ordering of the frame portions conforms with the nominal decoding order but not with the ordering of the data units within a frame portion; and a third value when the ordering of the data units and the ordering of the frame portions do not conform with the nominal data unit decoding order.

23. A method according to claim 22, wherein said processing comprises discarding the data units in case said ordering information is not compatible with decoding capabilities of a receiver receiving said data stream.

24. A method according to claim 22, wherein said processing comprises reordering the data units according to said ordering information.

25. A method according to claim 22, wherein said processing comprises initiating a negotiation process for determining decoding parameters to be set by a receiver receiving said data stream.

26. A non-transitory information storage means readable by a computer or a microprocessor storing instructions of a computer program, for implementing a method according to claim 1, when the program is loaded and executed by the computer or microprocessor.

27. A receiving device for processing a data stream having encapsulated therein data units representing frame portions of a video frame, said data units being encapsulated according to claim 1, the device comprising:

a memory, a processor coupled to the memory which executes the following:

parse an ordering information indicating the compliance of the order of the data units with said nominal data unit decoding order, and perform a processing of the data stream based on said ordering information, wherein the ordering information is set as follows:

a first value when the video stream conforms to the nominal data unit decoding order;

a second value when the ordering of the frame portions conforms with the nominal decoding order but not with the ordering of the data units within a frame portion; and a third value when the ordering of the data units and the ordering of the frame portions do not conform with the nominal data unit decoding order.

28. A transmitting device for encapsulating data units of at least one encoded video frame into a data stream, said data units representing frame portions of the video frame, the transmitting device comprising:
- a memory;
- a processor coupled to the memory which executes the following:
- determining whether said data units are capable of being decoded by a receiver according to an order of the data units different from a nominal data unit decoding order, and to encapsulate said data units into said data stream,
- wherein said data stream is associated with an ordering information indicating the compliance of the order of the data units with said nominal data unit decoding order, the ordering information being set as follows:
- a first value when the video stream conforms to the nominal data unit decoding order;
- a second value when the ordering of the frame portions conforms with the nominal decoding order but not with the ordering of the data units within a frame portion; and
- a third value when the ordering of the data units and the ordering of the frame portions do not conform with the nominal data unit decoding order.

29. A transmitting device according to claim 28, further comprising encapsulating data units of at least one encoded video frame into a data stream, said data units representing frame portions of the video frame, determining whether said data units are capable of being decoded by a receiver according to an order of the data units different from a nominal data unit decoding order, and encapsulating said data units into said data stream, wherein said data stream is associated with an ordering information indicating the compliance of the order of the data units with said nominal data unit decoding order, wherein said determining step is based on a partitioning configuration according to which said at least one encoded video frame has been partitioned into frame portions.

* * * * *